United States Patent
Mayer

(10) Patent No.: US 6,916,117 B2
(45) Date of Patent: Jul. 12, 2005

(54) BEARING SHELL FOR USE AS A CRANKSHAFT THRUST BEARING

(75) Inventor: Kai Martin Mayer, St. Augustin (DE)

(73) Assignee: Ford Global Technologies, LLC, Dearborn, MI (US)

( * ) Notice: Subject to any disclaimer, the term of this patent is extended or adjusted under 35 U.S.C. 154(b) by 68 days.

(21) Appl. No.: 10/065,371

(22) Filed: Oct. 10, 2002

(65) Prior Publication Data

US 2003/0072506 A1 Apr. 17, 2003

(30) Foreign Application Priority Data

Oct. 12, 2001 (EP) .............................. 01124490

(51) Int. Cl.$^7$ .............................. F16C 9/02; F16C 33/14
(52) U.S. Cl. ........................ 384/288; 384/291; 384/294
(58) Field of Search ................................ 384/275, 296, 384/322, 368, 397, 429, 276, 280, 283, 286, 288, 291, 294

(56) References Cited

U.S. PATENT DOCUMENTS

| | | | | |
|---|---|---|---|---|
| 2,258,834 A | * | 10/1941 | Willi ........................... | 384/291 |
| 2,364,290 A | * | 12/1944 | Hanson ....................... | 384/286 |
| 3,801,173 A | * | 4/1974 | McKindree .................. | 384/288 |
| 4,702,624 A | * | 10/1987 | Fontana ....................... | 384/294 |
| 4,714,356 A | * | 12/1987 | Damour et al. ............. | 384/275 |
| 4,845,817 A | * | 7/1989 | Wilgus ................... | 29/898.054 |
| 4,989,998 A | * | 2/1991 | Willis et al. ................ | 384/275 |
| 5,363,557 A | * | 11/1994 | Thompson et al. ..... | 29/898.041 |
| 5,536,089 A | * | 7/1996 | Weber et al. ................ | 384/294 |
| 6,056,441 A | * | 5/2000 | Scharrer et al. ............ | 384/118 |
| 6,086,258 A | * | 7/2000 | Cadle et al. ................ | 384/294 |

* cited by examiner

Primary Examiner—Thomas R. Hannon
(74) Attorney, Agent, or Firm—Diana D. Brehob

(57) ABSTRACT

A bearing shell for a crankshaft thrust bearing has a circumferential oil passage (4) formed on the inside of shell (6) of bearing shell (1). An oil passage (4) is connected via a hole (2) to the outside of and to a groove (7) running to one of flanges (5) and a hole (9) at the end of shell (1). In this way, the flange (8) is supplied oil to achieve improved lubrication in the axial loading direction.

4 Claims, 1 Drawing Sheet

BEARING SHELL FOR USE AS A CRANKSHAFT THRUST BEARING

BACKGROUND OF INVENTION

1. Field of the Invention

The invention relates to a bearing shell for a crankshaft thrust bearing and more particularly to lubrication passageways for providing oil to axial bearing surfaces.

2. Background of the Invention

A bearing shell has been disclosed in U.S. Pat. No. 5,363,557. The known bearing shell is cylindrical and has two halves, separated along the axis of the bearing shell. The two semi-cylindrical bearing shell halves are arranged around a crankshaft and mounted in the engine block. Mounting takes place both in the radial direction—via the insides of the shell of the bearing shells—and in the axial direction—via the outer surfaces, directed axially outward, of the flanges. Axial forces may be exerted on the crankshaft by the engine and the transmission.

To reduce the friction between the bearing shell and the crankshaft, the corresponding bearing surfaces are lubricated with an oil film. In the bearing shell according to '557, oil is directed via a passage through the engine block to the inside of the bearing shell. An oil passage, for the distribution of oil, is provided circumferentially. Furthermore, the transition between the flanges and the shell are beveled, so that a clearance space of triangular cross section, via which oil can be distributed, is produced here between the bearing shell and the crankshaft. In this case, oil is forced from the circumferential oil passage through the radial bearing surface to the ends of the shell to reach the clearance spaces. According to '557, suitable recesses may be provided in the outer surfaces of the flanges to provide for further distribution of the oil via the axial bearing surface.

In practice, it has been found that, crankshaft thrust bearings according to prior art, are subject to high wear due to thrust forces occurring in certain situations or in certain vehicle types. This high wear leads to rapid destruction of the bearing.

SUMMARY OF INVENTION

The bearing shell according to the invention consists of a shell which has the form of a cylinder separated axially through the center, the inside of this shell forming the radial bearing of a crankshaft. Provided on the two ends of the shell are flanges which are directed radially outward and the outer surfaces of which, as viewed in the axial direction, form the axial bearing of a crankshaft. Running circumferentially on the inside surface is at least one oil passage, via which oil is distributed around the crankshaft journal during rotation of the crankshaft to lubricate the bearing surface. In the fitted state, the oil passage is connected via an oil feed from the engine block. Furthermore, said oil passage is connected to at least one of the two flanges via a groove running axially in the shell.

The connection between the oil passage and one of the flanges achieves the effect that this flange is preferably supplied with oil, so that the axial bearing formed on this flange has good lubrication. Failures due to insufficient lubrication, as experienced in certain configurations of engines and transmissions, can thereby be avoided. The groove may lead to only one of the flanges or to both flanges. If the groove leads to both flanges, oil supply is increased commensurately. Wear phenomena have been observed at one of the two flanges because axial loads occur preferentially in one axial direction. Thus, significantly improved load-bearing capacity of the bearing can be achieved, even if the groove only leads to one of the flanges. Such bearing shell wear is prevented, according to the invention, by the groove leading to one end of the shell, since it provides for facilitated oil feed to the axial bearing subjected to greater loading. Furthermore, a groove to only one of flange has the advantage that oil pressure loss in the system is kept within narrow limits.

According to a preferred configuration, the groove described is arranged on the outside of the shell and is connected to the oil passage on the inside of the shell by at least one passage passing through the shell. The arrangement of the groove on the outside of the shell ensures that the oil flow through the groove is unimpeded by the oil flowing out of the radial bearing, since the groove forms an oil passage between the outside of the shell and the engine block, that is to say between two parts which are static relative to one another. In the case of only one groove, the direction of rotation of the crankshaft is considered when arranging the groove.

According to another feature of the present invention, the groove is advantageously connected to the outside of the flange by an opening passing through the flange. Via this opening, oil is directed from the groove to the surface of the axial bearing and is received and distributed there by the rotating crankshaft.

Clearance spaces are preferably formed at the flanges, via which clearance spaces further oil distribution over the surface of the axial bearing is effected. In this case, the clearance spaces are preferably connected to the abovementioned groove to directly receive the oil transported via the groove.

BRIEF DESCRIPTION OF DRAWINGS

The invention is explained by way of example below with reference to the figures.

DETAILED DESCRIPTION

Figure 1:
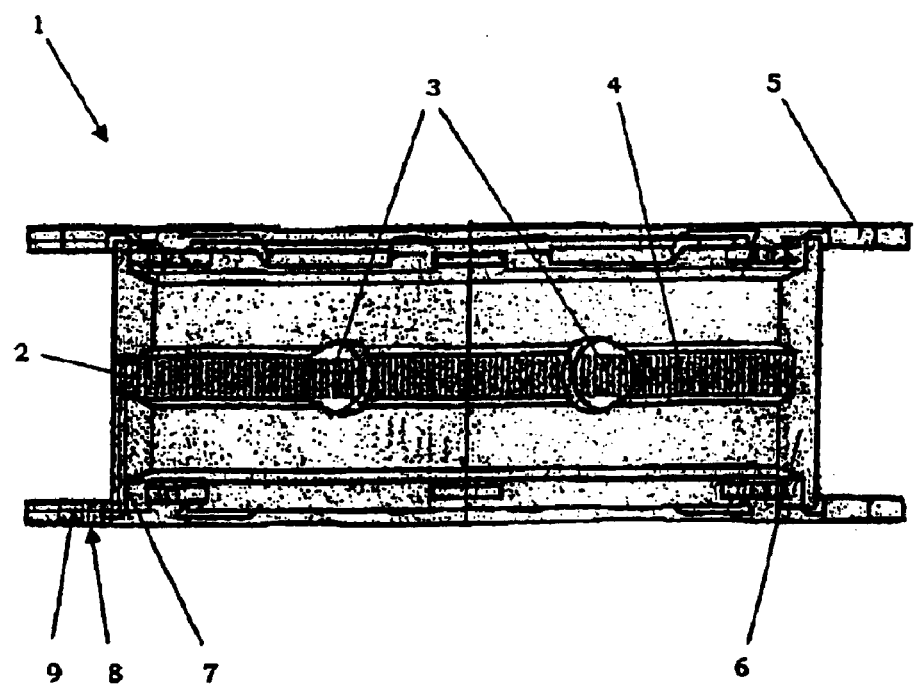
FIG. 1 shows a view of a semi-cylindrical bearing shell viewed from below.
Figure 2:
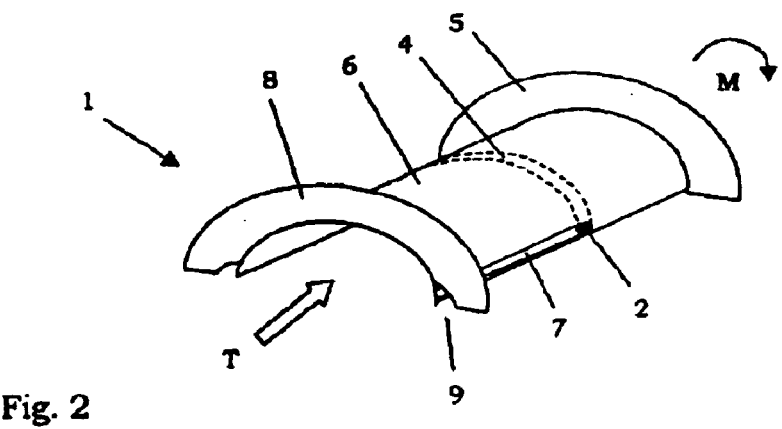
FIG. 2 is a schematic of the bearing shell of FIG. 1 in a perspective view.

Shown in FIGS. 1 and 2 is a semi-cylindrical bearing shell 1, which, with a second shell of this type, can be assembled around the crankshaft main bearing of a motor vehicle to mount the crankshaft relative to the engine block.

Bearing shell 1 has a shell 6 which has the form of a cylinder bisected axially. Flanges 5 and 8 directed radially outward are arranged on the two ends of shell 6. As assembled, the inside of shell 6 forms a radial bearing surface on which the crankshaft rotates; whereas, the outer surfaces of flanges 5 and 8 form the axial bearing surface for the crankshaft.

An oil passage 4 is formed all the way round on the inside of shell 6. As shown in FIG. 1, oil passage 4 is connected via two holes 3 passing through shell 6, so that oil can be delivered into oil passage 4. The feed for holes 3 is formed in the engine block and not shown in FIGS. 1 and 2.

Referring to FIG. 1, a further orifice or hole 2 is formed in shell 6. Hole 2 passes through shell 6 and communicates with oil passage 4. Hole 2 connects oil passage 4 and oil passage 7. Passage 7 is a passage on the outside of shell 6 running axially from hole 2 to flange 8. An opening 9 is provided in flange 8 so that oil delivery through oil passage 7 passes to the outside surface of flange 8. Through 3, 4, 2, 7, and 9, oil from the engine block is supplied to the outside surface of flange 8, an axial bearing surface. The oil path is indicated in FIG. 1 by cross-hatching. Similar lubrication passageways can be provided for flange 5, if so desired.

During rotation of the crankshaft, oil is drawn into the bearing shell and the crankshaft floats relative to the bearing shell on account of hydrodynamic effects.

In FIG. 2, the letters T and M indicate the positions of the transmission (T), on the one hand, and of the engine (M), on the other hand, relative to bearing shell 1. Furthermore, a curved arrow indicates the direction of rotation of the crankshaft or the engine. As a result, passage 7, formed on the outside of the shell 6, leads to the flange 8, which is situated closer to the transmission T. Flange 8 absorbs axial loads (block arrow) occurring in the direction from transmission T to engine M, with minimum wear due to improved oil lubrication.

I claim:

1. A bearing shell for use as a crankshaft thrust bearing, the bearing shell having a cylindrical shell, the inside surface of the shell forming a radial bearing surface for the crankshaft, and flanges at both ends of the shell directed radially outward, the outer surfaces of the flanges forming an axial bearing surface for the crankshaft, the bearing shell comprising:

at least one oil passage running circumferentially on an inside surface of the shell;

an axial groove running axially in the shell, said groove connecting said circumferential oil passage with at least one of the flanges wherein said groove is arranged on the outside of the shell; and an orifice passing through the bearing shell connecting said oil passage to said groove.

2. The bearing shell of claim 1, further comprising clearance spaces formed at the flanges for oil distribution on the flanges.

3. The bearing shell of claim 1, further comprising: an opening passage through the flange coupled to said groove.

4. The bearing shell of claim 3, further comprising clearance spaces formed at the flanges for oil distribution on the flanges.

* * * * *